Patented Nov. 21, 1939

2,181,096

UNITED STATES PATENT OFFICE 2,181,096

PRODUCTION OF FERREOUS METALS

Harold J. Ness, Bloomfield, N. J., assignor to Nesaloy Products, Inc., New York, N. Y., a corporation of New Jersey No Drawing. Application August 19, 1936, Serial No. 96,818. Renewed August 5, 1938

13 Claims. (Cl. 75—45)

This invention relates to a process of treating iron and steel and alloys thereof in their molten state and more particularly to a process of producing lithium iron and lithium steel or alloys thereof.

It has been proposed heretofore to treat ferreous metals with lithium by adding lithium or an alloy containing lithium directly to the molten iron or steel but due to the fact that lithium vaporizes very rapidly at the temperatures involved in such processes, it is quickly volatized from the molten bath and is thus ineffective to perform its intended function. As a consequence lithium has not been successfully used heretofore in the production of ferreous metals.

One of the objects of the present invention is to provide a commercially satisfactory method of treating molten iron and steel with lithium.

Another object is to provide a process of improving the physical properties of iron and steel.

Another object is to provide a process of treating iron and steel which is economical, reliable and which produces uniform results.

Another object is to reduce slag in the production of ferreous metals.

Still another object is to reduce or substantially eliminate foreign inclusions in iron and steel.

Another object is to produce a dense metal free from voids.

Other objects and advantages will hereinafter appear.

In accordance with my present invention I provide the melting furnace with an atmosphere which exhibits a lithium spectrum, maintain such atmosphere throughout the process, and provide a furnace lining which is resistant to the disintegrating effect of such atmosphere. By maintaining such atmosphere in the furnace, a portion of the lithium is absorbed into the molten mass and acts therein to eliminate impurities, such as oxides and other foreign inclusions.

The desired atmosphere may be produced by employing a furnace lining which is capable of absorbing lithium or a compound thereof and of liberating the same slowly during the treating process. It is desirable to condition the lining before use by treating the lining, either before or after assembly in the furnace, in the presence of a vapor of lithium, preferably at a temperature of 2000° F or more. The treatment can also be effected by painting a coating of a compound of lithium, such as lithium chloride, or lithium carbonate, thereon and heating the lining. The compound may be applied as a water solution or suspended or dissolved in other volatile vehicles.

While a furnace lining so treated will give off lithium vapor for a considerable period, some of the vapor is necessarily lost from the furnace or consumed by the molten bath and in order to maintain such atmosphere, additional amounts of lithium or lithium compound should be supplied as the process continues. This may be accomplished by generating a vapor from a supply of lithium contained in the furnace but I prefer to introduce it into the furnace from the outside. A very effective way I have found of supplying lithium to the furnace is by introducing the same into the air or fuel line either continuously or periodically. When introduced periodically, the lining serves as a storage and liberating medium whereby the desired atmosphere is maintained within the furnace between the periods of introduction of the lithium.

If the lithium is introduced into the furnace continuously or in frequent charges, any lining may be used which is resistant to the chemical action of the vapor produced or neutral thereto and incapable of absorbing lithium to such an extent as to preclude the maintenance of the desired atmosphere within the furnace, as for instance, linings of magnesium oxide.

In place of introducing metallic lithium into the furnace, a compound thereof such as lithium chloride, lithium fluoride or lithium carbonate may be used. The amount of lithium or compound thereof introduced or the frequency of introduction thereof may be determined by spectroscopic examination of the gases escaping from the furnace. I prefer to continuously maintain an atmosphere showing a pronounced lithium line in the spectroscope.

While, as stated, lithium will be absorbed into the molten iron or steel in the furnace in sufficient quantity to effect a scavenging of the metal, if desired a small proportion, preferably less than 1%, may be added directly to the bath either in metallic form or as a compound such as any of those named above, or in the form of an alloy in which the remaining constituent either volatizes out of the bath or forms a suitable alloying element with the product undergoing treatment. Due to the presence of a lithium conditioned atmosphere in the furnace, the volatilizing of the lithium out of the molten bath is retarded or replaced by lithium from the atmosphere and consequently a thorough and dependable cleansing of the metal occurs.

The process is particularly suitable for the production of stainless steel since the lithium prevents oxidation of the chromium in the steel. Moreover, stainless steel may be remelted in a lithium conditioned atmosphere without forming the usual excessive slag or dross, thus making it possible to utilize the scrap and croppings ordinarily discarded heretofore in the metallurgy of stainless steel.

In carrying out the process of the invention, any desired form of furnace, such as electric, open hearth, crucible, etc., may be used. The lining may be conditioned by introducing lithium or a compound thereof into the furnace while the furnace is at an elevated temperature or the lining may be painted with a water solution of a lithium compound, such as lithium chloride, and the furnace brought up to heat. After once being conditioned, the furnace may be used for successive heats by introducing lithium metal or compounds into the furnace either continuously or at such periods as is necessary to maintain a lithium line in the gases escaping from the furnace.

I prefer to introduce the lithium metal or compound into the furnace mixed with the air or fuel since this insures that it will pass through the hottest part of the flame, which is at a temperature several hundred degrees above the average furnace temperature. Hence the lithium or its compound will be more readily converted into a vapor. This may be accomplished by injecting the lithium metal in a comminuted form or a powedered compound thereof directly into the air or fuel line.

The lithium metal or compound may be introduced manually in small increments from time to time throughout the process as determined by experience or an inspection of the gases escaping from the furnace, but preferably it is supplied automatically either continuously or in definitely timed increments in accordance with a predetermined schedule.

The metal being treated may be contained in an open hearth furnace, the vapor produced by the lithium metal or compound thereof pervading the entire furnace above the metal and being absorbed into the molten bath to cleanse the same and to alloy in small amounts with the steel, the combined effect of which is to increase the density, and tensile strength of the steel, reduce voids, fissures and foreign inclusions. As heretofore stated, a small proportion of lithium in some form may be introduced directly into the molten bath, if desired.

The lithiated atmosphere is believed to prevent or retard the escape of lithium from the molten bath or to effect a replacement, at least in part of that which escapes, and the process results in a uniformity of product not heretofore obtainable.

While the process has been described with particular reference to the production of steel in an open hearth furnace, it is to be understood that other types of furnaces, such as cupola or electric furnaces, may be used. The process applies equally well to the production of other ferreous metals or alloys and the term ferreous metals is used in the claims to include iron, steel and alloys thereof.

As stated herein, the lithium spectrum condition may be produced in the furnace atmosphere by adding lithium metal or compound directly to the molten bath or by distillation from the furnace lining, or by introducing lithium or a compound or alloy thereof into the air or fuel stream. It is unknown whether the lithium in the atmosphere exists in metallic vapor form or as a compound of lithium, and therefore the term lithium is employed in the claims to include either the metal or a compound thereof in whichever form it occurs in the furnace atmosphere.

It will be understood, of course, that changes may be made in the process without departing from the invention, and I contemplate all such changes as are within the scope of the appended claims.

I claim:

1. The method of making lithiated ferreous metals which comprises heating said metals to the melting point in an atmosphere which exhibits a strong lithium spectrum.

2. The method of making lithiated ferreous metals which comprises heating said metals above the melting point in the presence of a lithium containing atmosphere.

3. The method of making lithiated ferreous metals which comprises heating said metals above the melting point in an atmosphere containing lithium in sufficient amount to produce a pronounced lithium spectroscopic line in the atmosphere.

4. The method of making lithium steel comprising heating the steel above the melting point thereof in a furnace and introducing lithium into the furnace atmosphere during the heating.

5. The method of making lithium steel comprising heating the steel to the melting point thereof in a furnace having an atmosphere containing lithium and a lining composed largely of magnesium oxide.

6. The method of making lithium steel comprising heating the steel to the melting point thereof in a furnace, and introducing lithium into the furnace atmosphere throughout the process in sufficient amount to produce a lithium spectroscopic line in the atmosphere of the furnace.

7. The method of producing chromium steel alloys comprising heating the chromium and steel to the melting point thereof and preventing substantial oxidation of the chromium by a protective atmosphere of lithium.

8. The method of producing a chromium steel alloy comprising heating the chromium and other alloying elements with iron above the melting point thereof and preventing substantial oxidation of the chromium by the addition of lithium to the atmosphere of the furnace.

9. The method of producing alloy steels containing elements which are readily oxidizable at their melting temperature comprising the melting of the ingredients of the alloy in the presence of a lithium containing atmosphere.

10. The method of producing alloys of lithium with ferreous metals by providing a lithium containing atmosphere about the molten metal.

11. The method of making lithiated ferreous metals comprising heating such metals to the melting point thereof in a furnace having an atmosphere containing lithium and a lining composed of a refractory resistant or neutral to lithium.

12. The method of making lithiated ferreous metals which comprises heating said metals to the melting point in an atmosphere containing lithium and adding lithium or a compound thereof to the molten metal.

13. The process of treating ferreous metals in their molten state to purify and scavenge the same and to improve the properties thereof which comprises heating said metals while in the molten state in an atmosphere containing lithium.

HAROLD J. NESS.